(No Model.)

J. S. DODGE.
AIR BOLT FOR FLOUR MILLS.

No. 523,335. Patented July 24, 1894.

Witnesses
John Laurie
Chas. S. Hyer.

Inventor
John S. Dodge,
By John Wedderburn
Attorney

UNITED STATES PATENT OFFICE.

JOHN S. DODGE, OF MINNEAPOLIS, MINNESOTA.

AIR-BOLT FOR FLOUR-MILLS.

SPECIFICATION forming part of Letters Patent No. 523,335, dated July 24, 1894.

Application filed May 17, 1893. Serial No. 474,608. (No model.)

*To all whom it may concern:*

Be it known that I, JOHN S. DODGE, of Minneapolis, in the county of Hennepin and State of Minnesota, have invented certain new and useful Improvements in Air-Bolts for Flour-Mills; and I do hereby declare the following to be a full, clear, and exact description of the invention, such as will enable others skilled in the art to which it appertains to make and use the same.

My invention relates to an improvement for separating and bolting flour, meal, and all kinds of fine material that has been properly reduced for bolting purposes, and has for its object to provide a simple and efficient method and apparatus for cheaply and thoroughly bolting flour, &c.

The invention consists in certain details of construction and arrangement of parts, as will be hereinafter fully pointed out in the description and claims.

Figure 1:
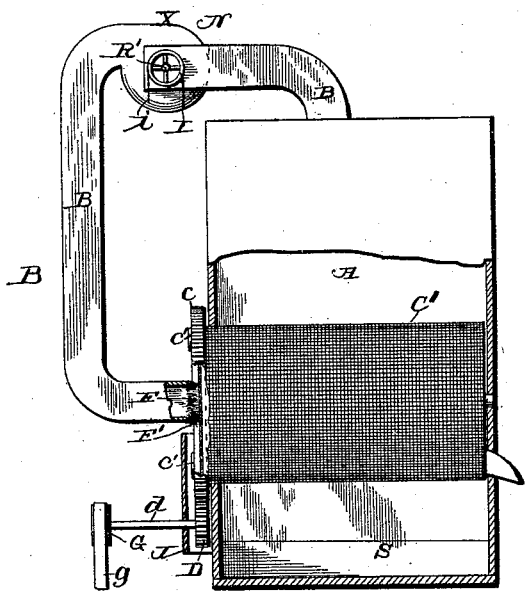
Figure 2:
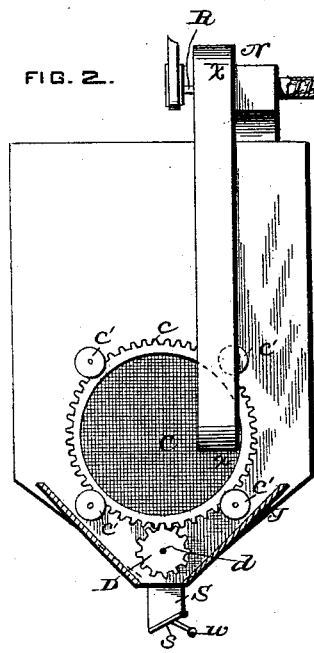
Figure 3:
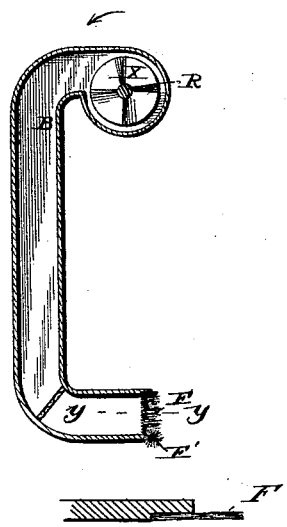
Figure 4:
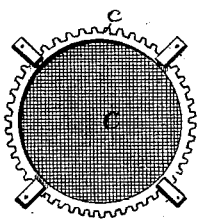
Figure 5:
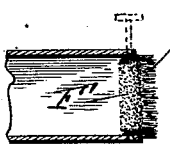

In the drawings, Figure 1, is a vertical section. Fig. 2, is a front elevation. Fig. 3, is a section through the air duct, on line $x$—$x$, Fig. 2. Fig. 4, is a detail sectional view of modification. Fig. 5, is an enlarged section of air duct on line $y$—$y$, Fig. 3.

A, represents a settling chamber provided at its bottom with a hopper S, this hopper being closed by a valve $s$, which is hung at its rear end to the said hopper in an inclined position. To the under surface of this valve $s$, is secured a weighted arm $w$, which tends always to keep the valve closed, except when overcome by the weight of material above it. It then allows of the exit of the material above, but prevents escape of air from above, or inlet of air from below.

The spout of the hopper S, is made with its front wall longer than its rear wall, and to the rear wall, the valve $s$, is hinged and held against the forward wall by the weighted arm $w$, this causing the valve to be shut in an inclined or oblique position.

In the settling chamber A, which has an opening for this purpose, is placed a rotary cylinder having a projecting end to form a circular vertical frame or screen C, which is made of silk or other suitable bolting cloth, and is provided on its periphery with cog teeth $c$, which mesh into a small cog wheel D, below, mounted on a horizontal shaft $d$, driven by a pulley G, and belt $g$. The rotary frame or screen C, is supported in place by small cog wheels $c'$, which are flanged to form guides, thus preventing side movement of the bolt. Or the bolt may be retained by means of brackets in place of the cogs $c'$.

To the top of the settling chamber A, is attached a duct or spout B, which projects to the front and is provided at the point N, with a rotary fan X, which is secured to the shaft R. It then continues forward a slight distance, and then downward to a point opposite the rotary frame or screen C, where it again turns, and continues toward and almost to the said rotary frame or screen. This spout or air duct is square in cross section, but it may be made circular if so desired. If the spout is made square, it is provided at the end that approaches the bolt C, with brushes F F', on each side. The spout at this point is cut away or separated to admit these brushes, and they then form a part of the spout or duct.

The top horizontal, and side vertical brushes are stationary, and the bottom horizontal brushes F', may also be so, but they may be revoluble, and are then revolved by friction caused by coming in contact with the rotary bolt. The purpose of these brushes is to keep the meshes of the bolting screen always open.

It will be observed that the spout or duct approaches the rotary frame or screen C, at point between the center and periphery of the said bolt. As the velocity of the bolt is greater nearer the periphery than the center, it will be seen that a much more marked action will be obtained by directing the product to be separated against the bolt at this point.

Immediately below, and partly inclosing the rotary frame or screen C, is placed the hopper J, the purpose of which will be hereinafter described.

At the point N, in the duct or spout B, or directly opposite to where the fan X, is placed therein, a conveyer is secured, which consists of a tube O, open at the end where it joins the duct or spout, having within it a screw or spiral conveyer P, which nearly fills the inclosing tube so as to admit only the grain, and exclude air. This tube is provided with an opening in its upper surface near its closed end for the admission of the material to be separated.

The screw or spiral conveyer is mounted on a shaft R', which is driven by a pulley I, and belt $i$. This shaft is driven from the shaft that drives the circular bolting frame by suitable connections not shown.

It will be seen that by rotating the fan X, in the direction of the arrow, a suction is produced in the settling chamber A, and a forced current in the vertical portion of the spout or duct, thus causing a continuous circulation, uninterrupted save by the rotary frame or screen C.

The frame or screen C, forms one end of a rotary cylindrical screen C', located within the settling chamber and over and above the hopper S. The opposite end of the said cylindrical screen may be relieved of its contents or the residuum that may remain therein through a chute or other suitable means as shown in Fig. 1.

The operating of the apparatus is as follows: The rotary parts being put in motion, the flour or other material to be separated is poured into the opening in the conveyer tube O, and conveyed thereby to the fan X, here it is mixed with air drawn from the settling chamber A, by suction, it is then forced down the spout and against the rotary frame or screen C. Those particles which are too coarse to be forced through the screen, are carried down between the brushes and the rotary bolt, and deposited in the hopper J. Portions of the grain fine enough to pass through the cloth of the frame or screen C, but too heavy to be carried up into the spout or duct B, by the continuous air current, are deposited in the hopper S, of the settling chamber A. The said portions of the grain which pass through the frame or screen C, enter the cylindrical screen C' and pass out from thence into the said hopper and the particles or other residuum which may still remain in the said cylindrical screen removed, as previously set forth. When a certain quantity of bolted material has been deposited in the hopper the weighted valve S, opens by the superior weight above, and allows of the escape of the contents to a suitable receptacle below. While the valve s, permits of the ready exit of the bolted product, yet it prevents the escape of air from the chamber above, or the ingress of air from below, thereby offering no obstacle to the perfect air circulation between the air spout B, and the settling chamber A.

By this method and apparatus of separating grain by a continuous air current mixed with grain, a very simple and efficient bolting device is produced for the separation of any material that has been properly reduced for bolting purposes.

In the air duct between fan and bolting cloth frame, is placed a coarse wire screen to prevent any large or coarse particles that would injure the mesh of the bolting cloth, from coming in contact with the bolt. This coarse wire screen covers the cross sectional area, and does not affect the velocity of the air current to an extent that would materially affect the principles involved in the foregoing description.

Having thus described my invention, what I claim is—

1. In an apparatus for separating grain, the combination of a settling chamber, an air duct containing a rotary fan, a rotary bolting screen against which one end of said air duct engages, and brushes in the outlet of said air duct for cleaning the end of the screen, the end of the bolting screen adjacent to said air duct being covered with gauze, substantially as described.

2. In an apparatus for separating grain, the combination of a settling chamber, an air duct containing a rotary fan, a bolting screen having a gauze covered end, against which said air duct is directed, and brushes F, secured within the sides and lower portion of the free end of the duct to clean the end of the screen, substantially as described.

3. In an apparatus for separating grain, the combination of a settling chamber, an air duct containing a rotary fan, a bolting screen having a gauze covered end against which said air duct is directed, stationary brushes in the opposite sides of the lower end of said duct and horizontal brushes in the bottom of said end of the duct, substantially as described.

In testimony whereof I have signed this specification in the presence of two subscribing witnesses.

JOHN S. DODGE.

Witnesses:
 IRVING E. GANNETT,
 H. O'B. HARDING.